United States Patent
Cole

(10) Patent No.: US 6,295,314 B1
(45) Date of Patent: Sep. 25, 2001

(54) METHOD AND APPARATUS FOR PARTITIONING A MODEM BETWEEN NON-REAL-TIME AND REAL-TIME PROCESSING ENVIRONMENTS

(75) Inventor: Terry L. Cole, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/192,859

(22) Filed: Nov. 16, 1998

(51) Int. Cl.$^7$ .................................. H04B 1/38; H04L 5/16
(52) U.S. Cl. ................................... 375/222; 375/295
(58) Field of Search .................................. 375/222, 219, 375/220, 295, 377; 370/276; 710/52, 55, 57; 713/360, 323

(56) References Cited

U.S. PATENT DOCUMENTS

| | | | |
|---|---|---|---|
| 3,750,107 | * 7/1973 | Pyne ........................................ | 370/465 |
| 4,398,299 | * 8/1983 | Darling et al. ........................ | 375/222 |
| 5,721,830 | 2/1998 | Yeh et al. . | |
| 5,910,970 | * 6/1999 | Lu ............................................. | 375/377 |
| 5,931,950 | * 8/1999 | Hsu ........................................ | 713/300 |
| 6,075,814 | * 6/2000 | Yamano et al. ........................ | 375/222 |
| 6,112,266 | * 8/2000 | Yeh ........................................ | 710/52 |

* cited by examiner

Primary Examiner—Stephen Chin
Assistant Examiner—Lenny Jiang
(74) Attorney, Agent, or Firm—Williams, Morgan & Amerson, P.C.

(57) ABSTRACT

A communications system includes a host computer, a modem communication unit, and a link interface unit. The host computer is capable of generating a plurality of user frames of digital data. The modem communication unit includes a frame buffer, an idle indicator insertion unit, and a modulator. The frame buffer is adapted to receive the user frames. The idle indicator insertion unit is adapted to generate an idle indicator if the frame buffer contains no user frames for transmission. The modulator is adapted to receive at least one of the user frames and the idle indicator to generate transmit data. The modulator is adapted to generate a plurality of waveform samples based on the transmit data. The link interface unit is adapted to receive the plurality of waveform samples and generate an analog transmit signal based on the plurality of waveform samples. A method for transmitting data includes generating a plurality of user frames of digital data. The user frames are stored in a frame buffer. It is determined if the frame buffer contains user frames for transmission. An idle indicator is generated in response to determining no user frames for transmission. Transmit data is generated based on at least one of the user frames and the idle indicator. A plurality of waveform samples is generated based on the transmit data. An analog transmit signal is generated based on the plurality of waveform samples.

17 Claims, 4 Drawing Sheets

METHOD AND APPARATUS FOR PARTITIONING A MODEM BETWEEN NON-REAL-TIME AND REAL-TIME PROCESSING ENVIRONMENTS

BACKGROUND OF THE INVENTION

1. Field of the Invention

This invention relates generally to modem communications and more particularly, to the partitioning of modem functions into a real-time part and a non-real-time part to maintain a reliable, stable modem connection.

2. Description of the Related Art

Modems are devices that transmit and receive computer data in real-time through radio or telephone lines. Some real-time functions of traditional hardware modems are being implemented as software routines, due to, among other things, less expensive manufacturing of such modems and their increased flexibility. These software routines are then typically executed on a host computer running under a multi-tasking operating system, such as Microsoft Windows®.

This particular class of modems, generally termed software modems, is considered relatively unstable in that, at any particular time, a software modem may drop its connection or fail to transfer data properly if the operating system is delayed in providing the necessary support to the modem on a real-time basis. For example, if the operating system is delayed in providing modem routine processing or bus transfers on a real-time basis, the software modem may drop its connection. This situation may occur when the operating system is heavily loaded servicing other routines, or when peripheral devices or device drivers seize system resources for relatively long periods of time.

Typically, the transmit pathway poses a problem for software modem implementations. In instances where the multi-tasking operating system cannot support real-time modem processing, the transmit pathway might run out of samples to transmit, and the connection might get dropped. To alleviate this problem, prior art software modems include additional buffering. This buffering typically occurs at the digital to analog (D/A) and analog to digital (A/D) sample level. For software modems, additional buffering is typically implemented on the Universal Asynchronous Receiver/Transmitter (UART) unit. Such buffering provides a real-time hardware interface environment to fill in the gaps in the transmission of samples during latency periods of the operating system. The ability of the software modem to successfully maintain the connection during periods of operating system latency depends on the size of the buffers.

Another technique to compensate for operating system latency is described in U.S. Pat. No. 5,721,830, issued to Yeh et al., and entitled "Host Signal Processing Communication System That Compensates for Missed Execution of Signal Maintenance Procedures." The Yeh technique refined the sample buffer to make it symbol aligned. In situations where the sample buffer runs out of samples, because the operating system has failed to maintain a real-time interface, the sample buffer simply repeats the entire previous symbol. One particular shortcoming of this technique is that repeated symbols may confuse the receiver, cause errors in the link, and eventually lead to call failure.

The present invention is directed to overcoming, or at least reducing the effects of, one or more of the problems set forth above.

SUMMARY OF THE INVENTION

An aspect of the present invention is seen in a communications system including a host computer, a modem communication unit, and a link interface unit. The host computer is capable of generating a plurality of user frames of digital data. The modem communication unit includes a frame buffer, an idle indicator insertion unit, and a modulator. The frame buffer is adapted to receive the user frames. The idle indicator insertion unit is adapted to generate an idle indicator if the frame buffer contains no user frames for transmission. The modulator is adapted to receive at least one of the user frames and the idle indicator to generate transmit data. The modulator is adapted to generate a plurality of waveform samples based on the transmit data. The link interface unit is adapted to receive the plurality of waveform samples and generate an analog transmit signal based on the plurality of waveform samples.

Another aspect of the present invention is seen in a method for transmitting data The method includes generating a plurality of user frames of digital data. The user frames are stored in a frame buffer. It is determined if the frame buffer contains user frames for transmission. An idle indicator is generated in response to determining no user frames for transmission. Transmit data is generated based on at least one of the user frames and the idle indicator. A plurality of waveform samples is generated based on the transmit data. An analog transmit signal is generated based on the plurality of waveform samples.

BRIEF DESCRIPTION OF THE DRAWINGS

The invention may be best understood by reference to the following description taken in conjunction with the accompanying drawings, in which like reference numerals identify like elements, and in which.

Figure 1:
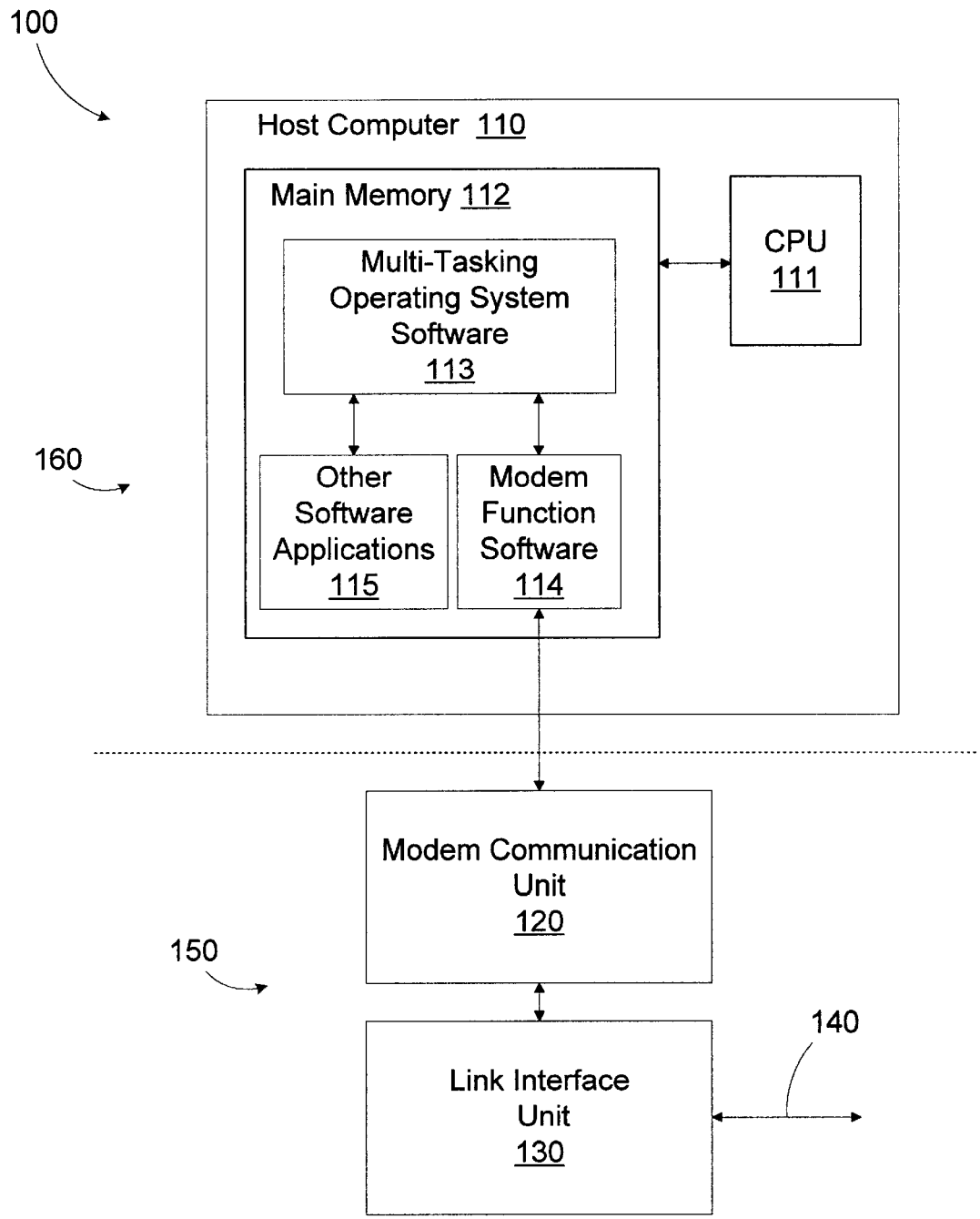
FIG. 1 is a block diagram of a communication system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described in reference to the attached drawings. Referring to FIG. 1, a block diagram of a communication system 100 in accordance with the present invention is provided. The communication system 100 includes a host computer 110, a modem communication unit 120, and a link interface unit 130. Communication with a remote device (not shown) is provided over a communication link 140 using an industry standard signal modulation and communication protocol.

The host computer 110 further includes a central processing unit (CPU) 111 and a main memory 112. In the illustrated embodiment, the CPU 111 executes multi-tasking operating system software 113, modem function software 114, and other application software 115 that reside in the main memory 112. In the illustrated embodiment, the multi-tasking operating system software 113 may not be real-time. In other words, the multi-tasking operating system software 113 may not always provide adequate resources from the CPU 111 to maintain continuous operation of the modem function software 114 and the other application software 115.

In the illustrated embodiment, the modem communication unit 120 is a specialized programmable processor or hardware device that performs certain modem tasks not performed by the modem function software 114 on the host computer 110. The modem communication unit 120 and the link interface unit 130 define the real-time processing portion 150 of the communication system 100. The host computer 110 that executes the multi-tasking operating system software 113 and the modem function software 114 define the non-real-time processing portion 160 of the communication system 100.

The partitioning of the modem functions between the real-time and non-real-time processing portions 150, 160 of the communication system 100 is conducted to increase the stability and reliability of the modem connection link 140 to increase the likelihood that the communication link 140 is maintained even if the multi-tasking operating system is unable to execute the modem function software 114 on a timely basis. The partitioning of the specific modem functions between the real-time and non-real-time processing portions 150, 160 of the communication system 100 as described herein represents an exemplary illustration based on a specific protocol. Those of ordinary skill in the art will readily recognize that a variety of different modem function partitions may be defined in light of the disclosure herein. In an actual application, the specific partitioning may vary, depending on the specific communication protocol used by the communication system 100.

Examples of industry standard voice-band modem protocols are V0.34, V42, V42bis, and V0.90. Exemplary broadband protocols are the ISDN protocol, ITU-T I.432, and the Asymmetric Digital Subscriber Line (ADSL) protocol, T1.412 Issue 2. The application of the present invention is not limited to a particular voice band or broadband protocol.

Figure 2:
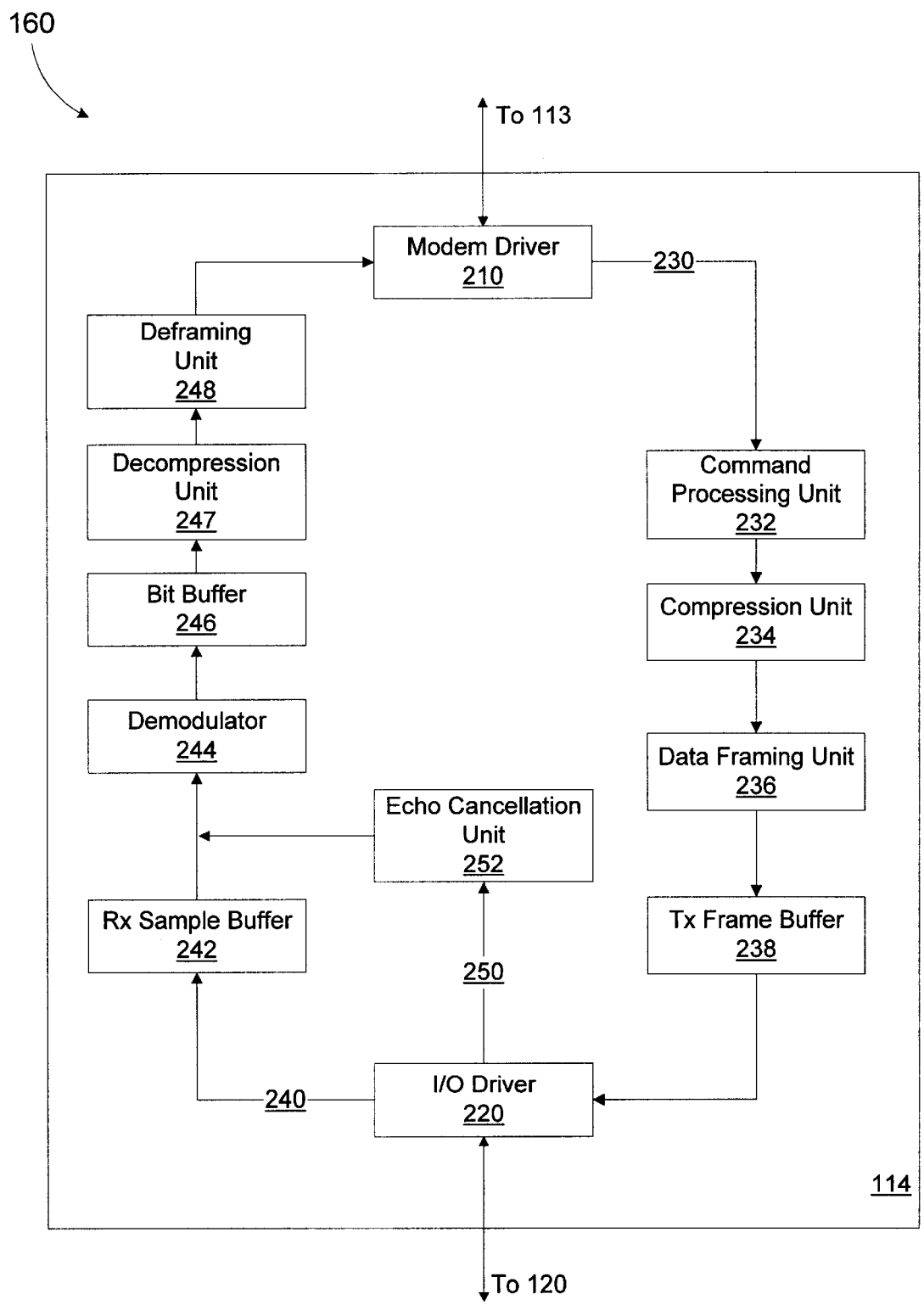
FIG. 2 is a block diagram of a non-real-time part of the modem of FIG. 1.

Turning now to FIG. 2, a simplified block diagram illustrating the functions performed by the non-real-time processing portion 160 of the communication system 100 is provided. As described above the non-real-time modem functions are encoded in the modem function software 114 and executed by the CPU 111 under the control of the multi-tasking operating system software 113. Again, those of ordinary skill in the art will readily recognize that, in an actual embodiment, the specific functions may change, depending, in part, on the modem protocol being implemented. It is contemplated that some of the functions assigned to the non-real time portion 160 may be alternatively assigned to the real-time portion 150, and vice versa.

The non-real-time portion 160 of the communication system 100 includes contains two interface drivers, a modem driver 210 and an input/output (I/O) driver 220. The modem driver 210 communicates with the multi-tasking operating system software 113, and the I/O driver 220 communicates with the modem communication unit 120. Both drivers 210, 220 pass and receive data and/or commands to and from the units to which they are connected.

The non-real-time processing portion 160 is subdivided into the three traditional modem functional paths, a transmission pathway 230, a receive pathway 240, and an echo cancellation pathway 250. The functions and apparatus in the pathways 230, 240, 250 are performed by the modem function software 114, but for ease of illustration, these functions are broken down into "units," where a unit represents the portion of the modem function software 114 that performs the described function. Again, the specific functions may be: application and/or protocol dependent.

The transmission pathway 230 includes a modem command processing unit 232 for receiving modem commands (e.g., AT commands) from the modem driver 210, a data compression unit 234 for compressing data to be transmitted, a data framing unit 236 for grouping the data to be transmitted into frames, and a transmit (Tx) frame buffer 238 for storing the frames of data. The frames may be fixed length or variable length, depending on the specific protocol. The frames of data are passed from the Tx frame buffer 238 to the I/O driver 220. Exemplary compression and framing protocols are defined in V0.42bis and V0.42, respectively. These protocols are listed for illustrative purposes and are not intended to limit the application of the invention. The invention may be implemented using any protocol.

The particular functions performed in the receive pathway 240 depend on, among other things, the specific protocol being implemented. A receive sample buffer 242 receives digital samples of the received waveform. A demodulator 244 performs timing recovery, equalization, constellation decoding (e.g., Viterbi if trellis is used), and descrambling functions. A bit buffer 246 stores the demodulated data, a decompression unit 247 (e.g., V0.42bis) decompresses the demodulated data, and a deframing unit 248 (e.g., V0.42) extracts the data from the frames of data provided by the decompression unit 247 and provides it to the modem driver 210.

The echo cancellation pathway 250 includes an echo cancellation unit 252 adapted to receive the transmit waveform produced by the modem communication unit 120 (discussed in greater detail below in reference to FIG. 3) and cancel the transmit waveform from the received waveform. It is contemplated that the echo cancellation unit 252 may be incorporated into the demodulator 244.

Figure 3:
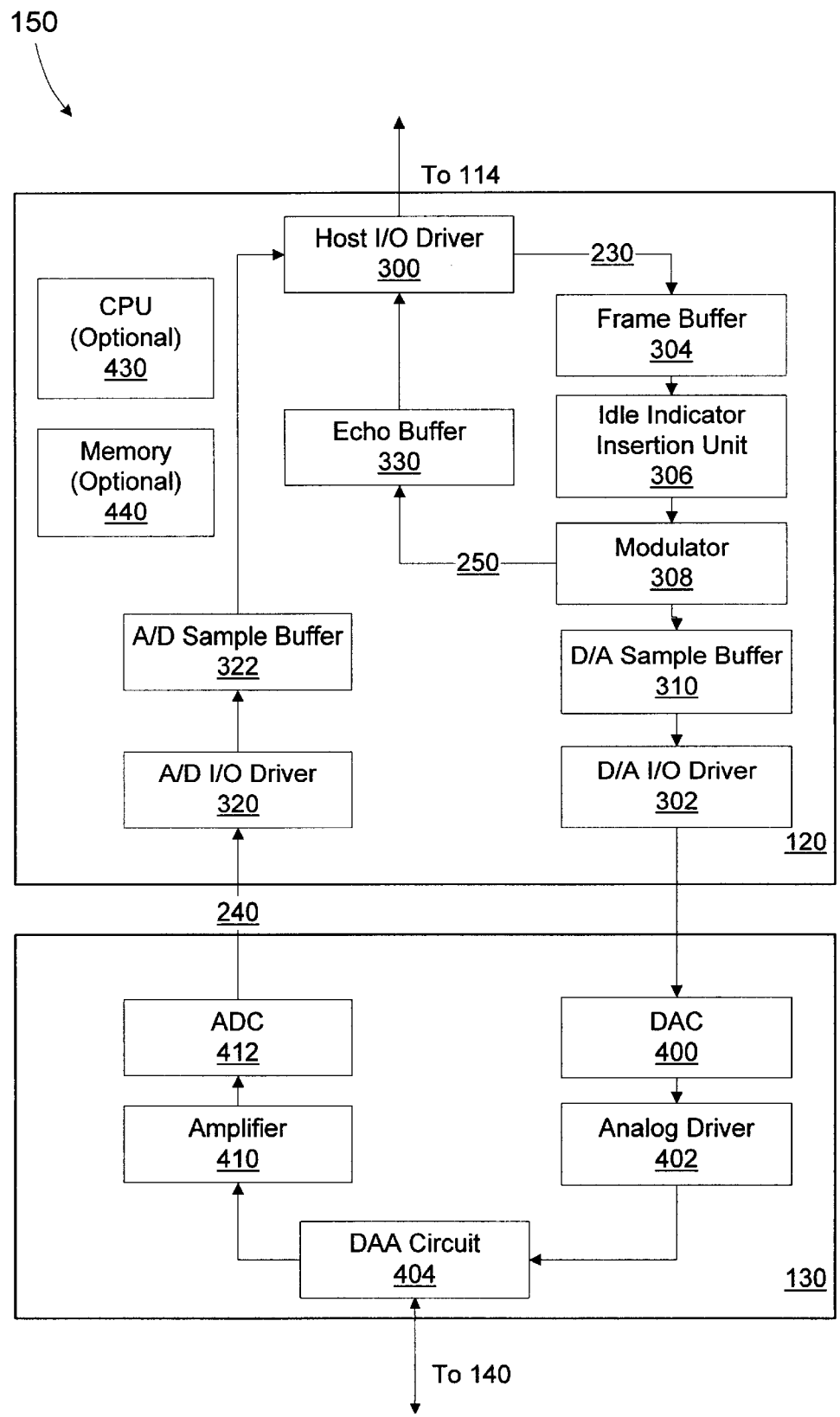
FIG. 3 is a block diagram of real-time part of the modem of FIG. 1.

Referring to FIG. 3, a block diagram of the real-time processing portion 150 is shown. The modem communication unit 120 provides resources for supporting the remaining functions of the transmit, receive, and echo cancellation pathways 230, 240, 250. The modem communication unit 120 includes an I/O driver 300 for communicating with the modem function software 114 on the host computer 110, and a D/A I/O driver 302 for communicating with the link interface unit. The modem communication unit 120 performs certain functions to support the transmission pathway 230. The modem communication unit 120 includes a frame buffer 304 for storing frames of user data, and an idle indicator insertion unit 306 for providing an idle indicator when the frame buffer runs out of user data for transmission. A modulator 308 performs scrambling, constellation encoding (i.e., may include trellis coding), waveform modulating, and pulse shape filtering functions. A digital-to-analog (D/A) sample buffer 310 receives the waveform samples from the modulator 308.

To support the receive pathway 240, the modem communication unit 120 includes an A/D I/O Driver 320 for communicating with the link interface unit 130, an A/D sample buffer 322 for receiving samples from the link interface unit 130 through the D/A I/O driver 302. The A/D sample buffer 322 provides the received data samples to the host I/O driver 300.

The modem communication unit 120 supports the echo cancellation pathway 250 with a echo buffer 330 for storing the transmitted data generated by the modulator 308. The data in the echo buffer 330 is provided to the echo cancellation unit 252 in the modem communication unit through the host I/O driver 300.

The link interface unit 130 includes a digital-to-analog converter (DAC) circuit 400 for communicating with the D/A I/O driver 302 on the modem communication unit 120 on the transmission pathway 230. The DAC 400 provides an analog transmit waveform to an analog driver 402. The analog driver 402 is coupled to a hybrid and data access arrangement (DAA) circuit 404 for interfacing with the communication link 140 using standard POTS (plain old telephone system) signaling techniques (e.g., two-wire to four-wire conversion, on and off-hook impedances, ring detection, FCC regulated electronics, etc.) The hybrid and DAA circuit 404 is connected to the communication link 140.

To support the receive pathway 240, the link interface unit 130 includes an amplifier 410 adapted to receive an analog waveform from the communication link 140 through the DAA circuit 404. The amplifier 410 is coupled to an analog-to-digital converter (ADC) circuit 412. The ADC 412 samples the received waveform to generate receive waveform samples, which are transferred to the A/D sample buffer 322 of the modem communication unit 120 by the A/D I/O driver 320.

The operation of the idle indicator insertion unit 306 in the modem communication unit 120 is described in greater detail to illustrate how an idle indicator might be generated in accordance with certain exemplary protocols. Again, these exemplary illustrations are not intended to limit the application of the present invention, but rather to provide insight as to how they might be implemented using current communication protocols.

The idle indicator insertion unit 306 inserts idle indicators when the frame buffer 304 contains no user data for transmission. This lack of data may have occurred due to the multi-tasking operating system software 113 not having sufficient processing resources to service the modem function software 114 and maintain a steady flow of transmit data. In the case where the frame buffer 304 is a buffer having a head pointer to indicate the most recently added frame and a tail pointer to indicate the next frame for transmission, the idle indicator insertion unit 306 may identify the underflow (i.e., lack of user frames) if the tail pointer catches up with the head pointer.

A first example for generating an idle indicator is described in reference to the V0.42 communication protocol. The V0.42 protocol defines an interframe time fill technique where a series of repeating flags are transmitted in the absence of user data. These flags are typically used as part of the frame demarcation process for identifying the start and end of a frame. Each flag has a binary value of "01111110." If implementing the V0.42 protocol, the idle indicator insertion unit 306 generates the idle indicator by transmitting repeating flags until new user data is written to the frame buffer 304.

A second example for generating the idle indicator is described in reference to the ISDN protocol. The ISDN transmission protocol defines a fixed-length 58-byte frame format for all frames of data to be transmitted. A predefined idle cell is defined. The idle cell includes a four byte header (e.g., 00000000 00000000 00000000 00000001), a one byte header error correction field (e.g., 01010010), and 48 bytes of a repeated information field (e.g., 01101010). The idle indicator insertion unit 306 generates the idle indicator by transmitting repeating idle cells until new user data is written to the frame buffer 304.

The previously described idle indicators were provided for illustrative purposes. It is contemplated that other idle indicators (e.g., predefined messages, flags patterns, idle frames, etc.) may be defined, depending on the specific application and/or protocol.

Figure 4:
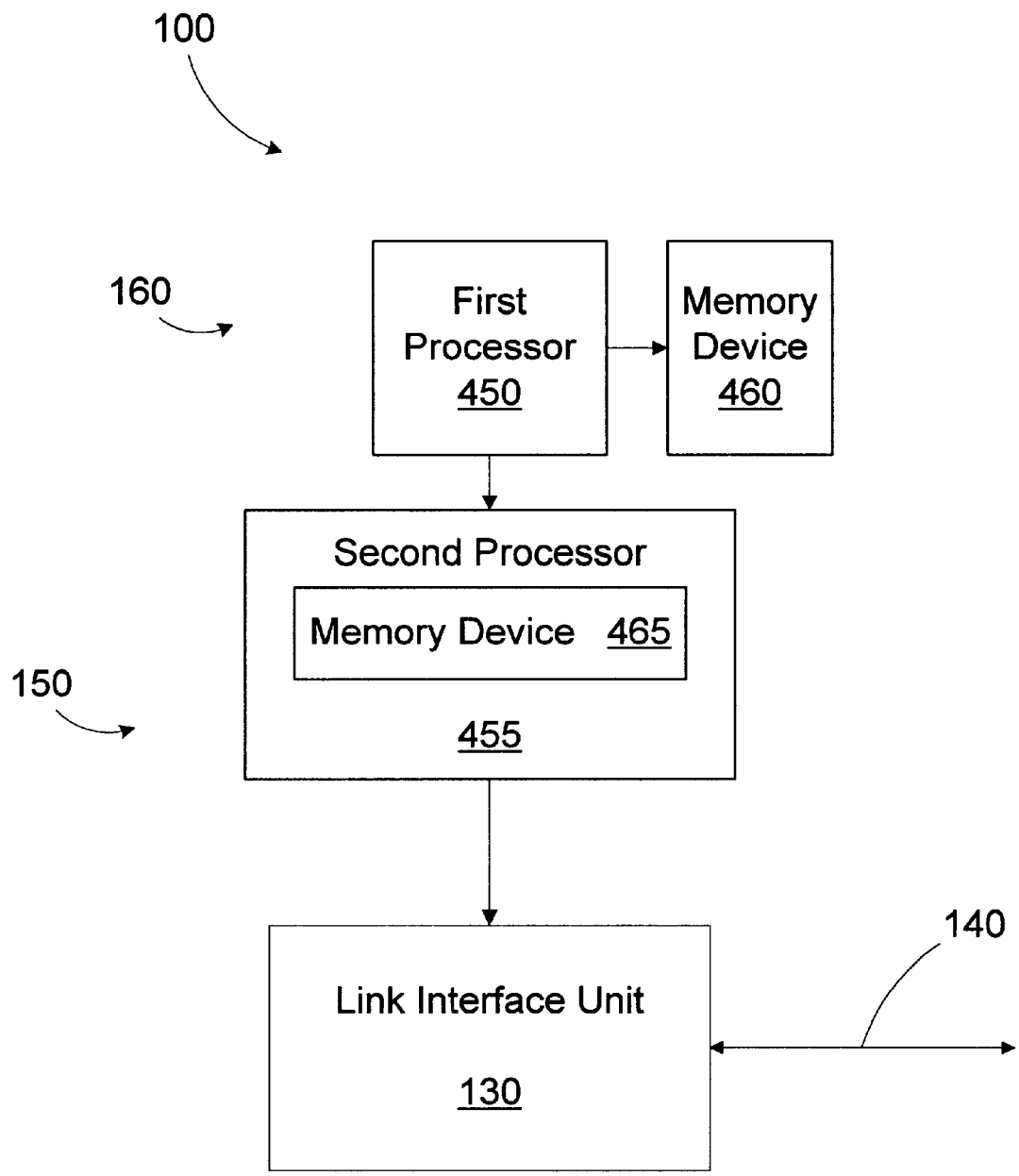
FIG. 4 is a block diagram of an alternative embodiment of a communications system in accordance with the present invention.

Turning now to FIG. 4 a block diagram of the communication system 100 of FIG. 1 as it may be implemented using a first processor 450 and a second processor 455. The first processor has an associated first memory device 460 for storing program instructions to perform the non-real-time processing functions described above for the modem function software 114. The second processor 455 may include an embedded memory 465 as shown, or alternatively, the second processor 455 may have an associated external memory device (not shown) for storing program instructions that perform, among other things, the idle indicator insertion and modulation functions. The second processor 455 operates independently of the first processor 450. The first processor 450 may operate under a non-real-time operating system such as Windows® 3.1, 95, or 98.

In the illustrated embodiment, the second processor 455 is a single-chip 486 processor with embedded memory. The second processor 455 does not operate under the control of the operating system. Accordingly, the second processor can maintain the idle indicator insertion function if the first processor 450 is not available. It is contemplated that the second processor may also comprise a general purpose processor, a digital signal processor, an application specific integrated circuit (ASIC), or any other type of processing unit.

It is also contemplated that the real-time processing functions (i.e., idle frame insertion and modulation) may be performed by other processing resources that operate independently of the CPU 111 in the host computer 110. For example, the host computer 110 may include an xDSL protocol processor (not shown), a network processor (not shown), an I/O processor (not shown), or an additional CPU (not shown) with memory.

In the illustrated embodiment the receive pathway 240, especially during data mode, can actually be implemented using non-real time software, as illustrated in FIG. 2. In the training mode, a similar work division can be specified, however, if the operating system is lost during training the code should retrain. It is contemplated that a plurality of precomputed segments may be downloaded into the modem communication unit 120 prior to or during the training period, such that latency of the operating system would not affect the training mode.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A communications system, comprising:
    a host computer capable of generating a plurality of user frames of digital data;
    a modem communication unit, comprising:
        a frame buffer adapted to receive the user frames;
        an idle indicator insertion unit adapted to generate an idle indicator if the frame buffer contains no user frames for transmission; and
        a modulator adapted to receive at least one of the user frames and the idle indicator to generate transmit data, and to generate a plurality of waveform samples based on the transmit data; and
    a link interface unit adapted to receive the plurality of waveform samples and generate an analog transmit signal based on the plurality of waveform samples.

2. The communications system of claim 1, wherein the idle indicator comprises an idle cell.

3. The communications system of claim 1, wherein the idle indicator comprises a plurality of repeating flags.

4. The communications system of claim 3, wherein each flag comprises the binary value 01111110.

5. The communications system of claim 1, wherein the modem communication unit further comprises a sample buffer adapted to store the plurality of waveform samples.

6. The communications system of claim 1, wherein the link interface unit comprises a digital-to-analog converter.

7. The communications system of claim 1, wherein frames comprise fixed-length frames.

8. The communications system of claim 1, wherein the host computer is adapted to execute a non-real-time operating system and modem application software, wherein the modem application software is adapted to generate the plurality of user frames of digital data, and the modem application software interfaces with the non-real-time operating system.

9. The communications system of claim 8, wherein the modem communication unit operates independently of the non-real-time operating system.

10. A method for transmitting data, comprising:
    generating a plurality of user frames of digital data;
    storing the user frames in a frame buffer;
    determining if the frame buffer contains user frames for transmission;
    generating an idle indicator in response to determining no user frames for transmission;
    generating transmit data based on at least one of the user frames and the idle indicator; generating a plurality of waveform samples based on the transmit data; and
    generating an analog transmit signal based on the plurality of waveform samples.

11. The method of claim 10, wherein generating the idle indicator includes generating an idle cell.

12. The method of claim 10, wherein generating the idle indicator includes generating a plurality of repeating flags.

13. The method of claim 10, wherein generating the idle indicator includes generating a plurality of repeating flags, each flag comprising the binary value 01111110.

14. The method of claim 10, further comprising storing the plurality of waveform samples in a sample buffer.

15. The method of claim 10, generating the plurality of user frames of digital data includes generating a plurality of fixed-length frames.

16. A communications system, comprising:
    a first processor adapted to generate a plurality of user frames of digital data;
    a modem communication unit, comprising:
        a frame buffer adapted to receive the user frames;
        a second processor;
        a memory device for storing a plurality of program instructions, that when executed by the second processor:
            determine if the frame buffer contains user frames for transmission;
            generate an idle indicator in response to determining no user frames for transmission;
            generate transmit data based on at least one of the user frames and the idle indicator; and
            generate a plurality of waveform samples based on the transmit data; and
    a link interface unit adapted to receive the plurality of waveform samples and generate an analog transmit signal based on the plurality of waveform samples.

17. A communications system, comprising:
    means for generating a plurality of user frames of digital data;
    means for storing the user frames in a frame buffer;
    means for determining if the frame buffer contains user frames for transmission;
    means for generating an idle indicator in response to determining no user frames for transmission;
    means for generating transmit data based on at least one of the user frames and the idle indicator; and
    means for generating a plurality of waveform samples based on the transmit data; and
    means for generating an analog transmit signal based on the plurality of waveform samples.

* * * * *